May 6, 1930.  C. R. TIBBETTS  1,757,490
HAND TRUCK
Filed May 29, 1929   2 Sheets-Sheet 1
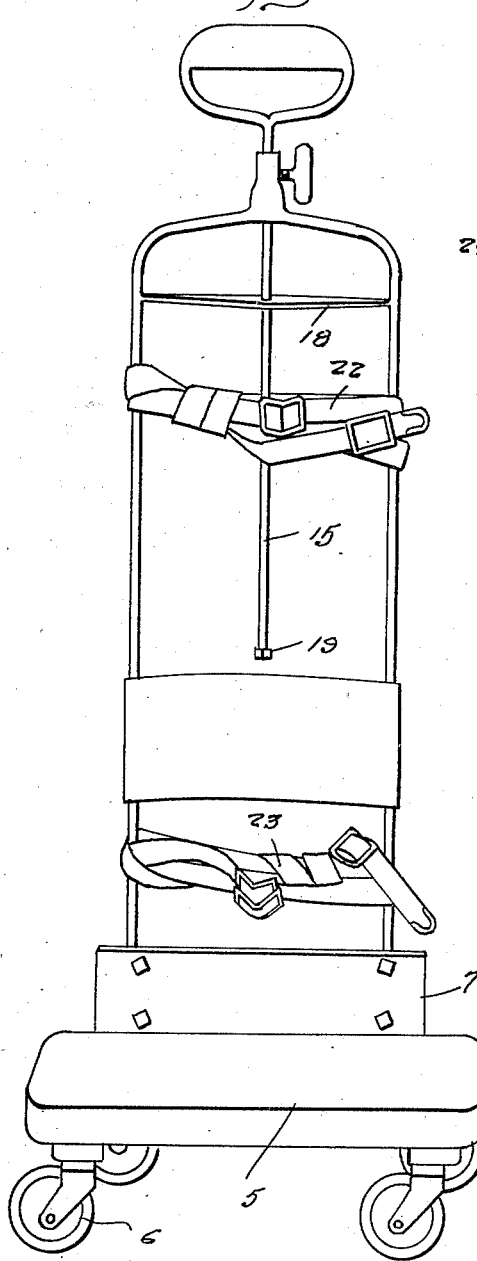
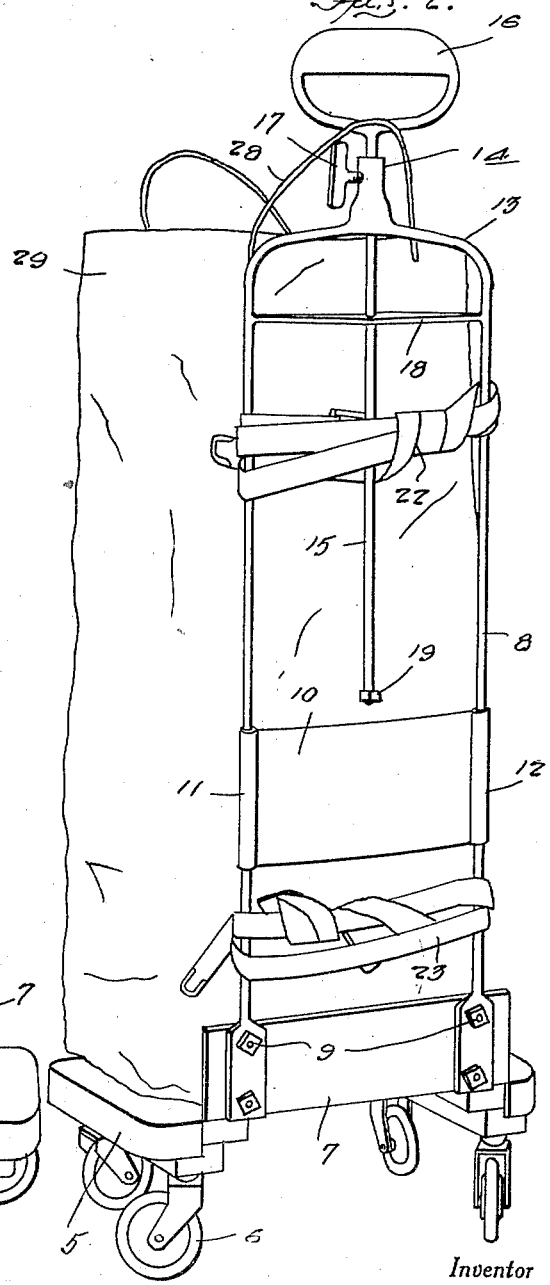
Inventor
C. R. Tibbetts
By Clarence A. O'Brien
Attorney

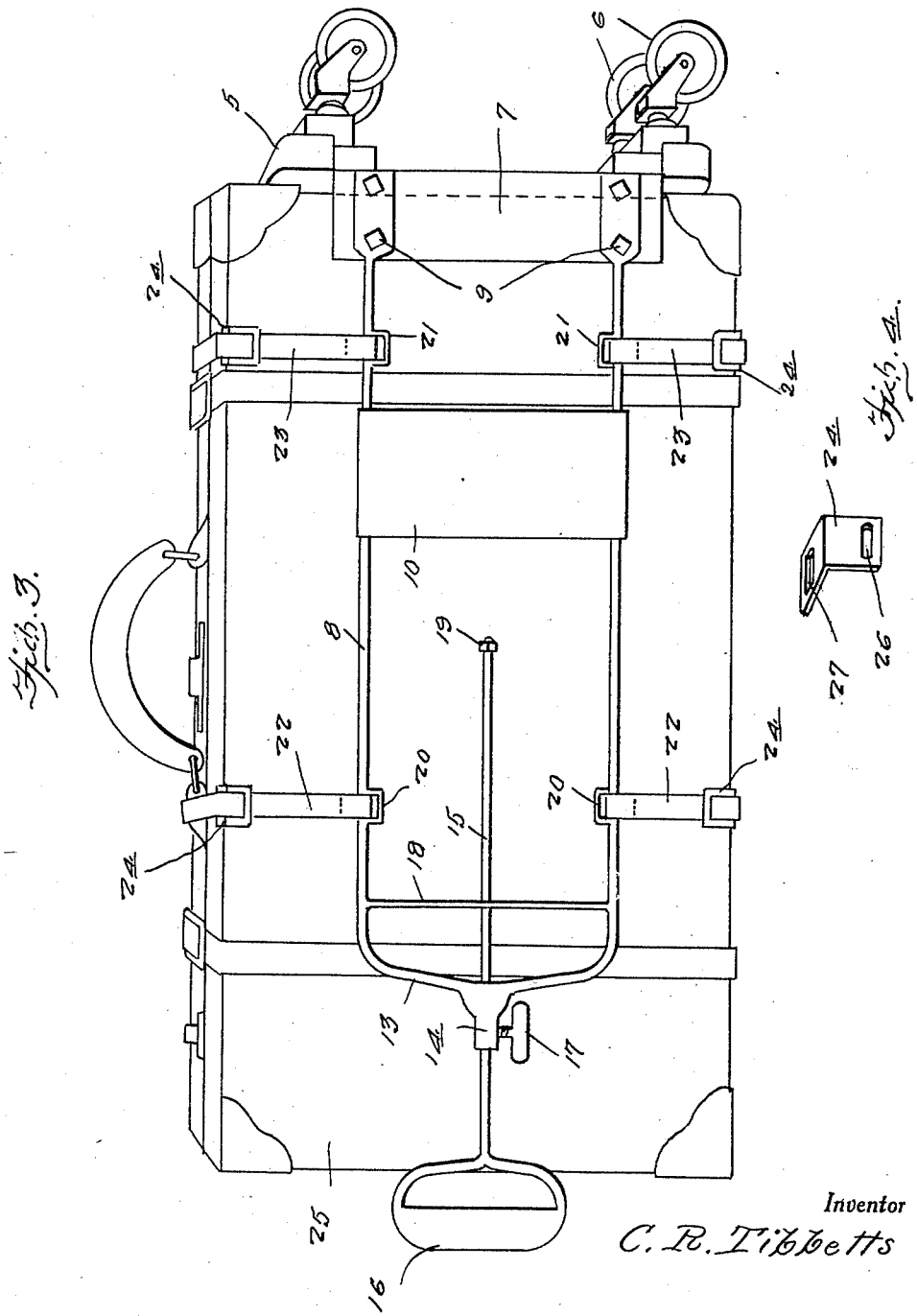

Patented May 6, 1930

1,757,490

UNITED STATES PATENT OFFICE

CYRUS R. TIBBETTS, OF COLTON, CALIFORNIA

HAND TRUCK

Application filed May 29, 1929. Serial No. 367,040.

This invention relates to hand trucks of universal application, and an object of the invention is to provide a truck of the character described, that may be utilized to carry any reasonable amount of merchandise with very little effort and at the same time is adapted for permanent attachment to suit cases or other receptacles, so that the same may be rolled instead of carrying the same.

Another object of the invention is to provide swivelled rollers on the truck and place a handle within easy grasp of the operator so that the truck and objects being carried may be rolled with ease and convenience.

A further object of the invention is to provide an adjustable handle suitable for various sized persons and to furthermore provide straps for permanently securing suit cases to the truck and to provide adjustable means on the strap to prevent the suit case from working loose on the truck.

Still further objects of the invention are to provide, in the manner as hereinafter set forth, a truck of the character referred to, which is strong, compact and durable, very light in its construction, thoroughly reliable in its operation, occupying a minimum amount of space when permanently attached to a suit case, very simple in its method of assembly, and comparatively inexpensive to manufacture and operate.

With these and other objects in view, the invention consists in a novel construction, combination and arrangement of parts as will be hereinafter more specifically described and illustrated in the accompanying drawings, wherein is disclosed an embodiment of the invention, but it is to be understood that changes, variations and modifications may be resorted to, without departing from the spirit of the claims hereunto appended.

In the drawings:

Figure 1 is a side elevation of the device in accordance with this invention.

Figure 2 is a perspective view thereof, illustrating a loose receptacle attached thereto.

Figure 3 is a side elevation thereof, illustrating a suit case permanently attached thereto, and Figure 4 is a perspective view of one of the cleats mounted on the straps.

Referring to the drawings in detail, 5 is a rectangular platform supported in spaced relation to the ground on four rollers 6 swivelly mounted at the corners of the platform on the under face thereof. The platform 5 is supported in a horizontal position and is provided along one longitudinal edge with a vertically disposed flange 7, to which is secured the lower end of an open U-shaped vertically disposed frame 8 by means of the bolts 9. The frame 8 is formed of a rod bent to U-shaped form and is provided intermediate its ends with a reinforcing plate 10. The legs of the frame extend through sleeves 11, 12, formed on the opposite ends of the plate, whereby the latter is secured to and reinforces the frame 8. The bight portion 13 of the frame is formed with an outwardly projecting sleeve 14, in which is slidably mounted a substantially elongated rod 15 having a gripping means 16 on the outer end thereof. The sleeve 14 is provided with a set screw 17, which engages the rod 15, so as to secure the handle 16 at any desired position to suit the heights of various sized persons.

A cross strap 18 is secured to the legs of the frame 8 at its opposite ends and the rod 15 passes through the brace intermediate its ends so as to take the strain off of the sleeve 14 when angular pull or angular weight is applied to the handle. A strap nut 19 is threadedly mounted on the inner end of the rod 15 to prevent the same from slipping out of the sleeve 14 in the event that the set screw should become loosened. It is pointed out that the brace 18 aids to slidably support the frame 8 as well as to support the rod 15.

Intermediate the ends of the legs of the frame 8, the legs are provided with aligned pairs of coupling eyelets 20, 21, vertically spaced from each other, by which the ends of the spaced straps 22, 23, are coupled to the frame 8. The free ends of the straps 22, 23, are provided with conventional buckles for securing the ends together, which are not shown in the drawings, and the straps 22, 23 have slidably mounted thereon four cleats 24 of angular configuration and disposed as is shown in Figure 3 of the drawings when in operative use.

While the cleats 24 have been described as being slidable on the straps 22, 23, when the same are secured to rigid corners of a suit case 25 and the straps are buckled together, the corner cleats 24 prevent the suit case 25 from working loose on the truck. The cleats 24 are formed in the same manner and each consists of a plate bent at right angles and provided adjacent the ends of the legs thereof with slots 26, 27, through which the strap 22 or 23 is trained. The cleats 24 are adjustable with respect to the length of the straps 22, 23, whereby the same are adaptable to all sized suit cases or other receptacles.

In Figure 3 of the drawings, the truck, in accordance with this invention is shown attached to a suit case whereby the same may be either carried by the handle of the suit case or rolled along on the rollers 6, and when the truck is not being utilized for carrying suit cases, the straps 22, 23, may be rolled and folded out of the way, as indicated in Figures 1 and 2 of the drawings.

In Figure 2 of the drawings, there is shown the conventional carry-all guide bags supported on the truck having one of the looped handles 28 of the bag 29 trained over the gripping handle 16, whereby the bag 29 is prevented from falling off the truck. By reason of having the rollers 6 disposed at the corners of the platform 5 and at the same time having the rollers swively connected to the platform, the truck is very easily manipulated by gripping the handle 16 and may be pushed in all directions with ease. In the event that the truck is to be pushed in an angular direction, the rear pair of rollers 6 will movably support the truck in this latter position.

What is claimed is:

1. A hand truck of the character described comprising a horizontal platform, a plurality of rollers swivelled to the platform, a frame mounted on one side of the platform and extending vertically therefrom and provided with a sleeve at the upper end thereof, an adjustable handle slidably mounted in the sleeve and means on the sleeve for securing the handle in fixed relation with respect to the frame, said frame provided with a pair of oppositely disposed eyelets and straps secured to the eyelets for securing a receptacle to the platform, and a plurality of angular cleats slidably mounted on the straps to overlap corners of the receptacle to prevent the movement thereof with respect to the platform, said frame provided with a reinforcing bar and said handle slidably supported in said reinforcing bar to relieve the strain on the supporting sleeve.

2. A hand truck of the character described comprising a rectangular horizontally disposed platform, rollers swivelled to the under side of the platform at the corners thereof, a substantially U-shaped frame mounted on one side of the platform and extending vertically therefrom, and a sleeve projecting vertically from the bight portion thereof, a reinforcing bar secured at its opposite ends to the legs of the frame, an adjustable handle slidably mounted in the sleeve and the reinforcing bar, and means on the sleeve for securing the handle in fixed relation with respect to the frame, said frame provided with a pair of oppositely disposed eyelets, straps secured to the eyelets, for securing a receptacle to the platform, and a plurality of angular cleats slidably mounted on the straps to overlap the corners of the receptacle to prevent movement thereof with respect to the platform.

In testimony whereof I affix my signature.

CYRUS R. TIBBETTS.